US012654988B2

(12) United States Patent
Aitamurto et al.

(10) Patent No.: US 12,654,988 B2
(45) Date of Patent: Jun. 16, 2026

(54) ELEVATOR SAFETY SYSTEM, METHOD FOR COLLISION PROTECTION IN AN ELEVATOR SYSTEM, AND ELEVATOR SYSTEM

(71) Applicant: KONE Corporation, Helsinki (FI)

(72) Inventors: Juha-Matti Aitamurto, Helsinki (FI); Ari Kattainen, Helsinki (FI)

(73) Assignee: KONE CORPORATION, Helsinki (FI)

( * ) Notice: Subject to any disclaimer, the term of this patent is extended or adjusted under 35 U.S.C. 154(b) by 1222 days.

(21) Appl. No.: 17/474,382

(22) Filed: Sep. 14, 2021

(65) Prior Publication Data

US 2022/0106163 A1 Apr. 7, 2022

(30) Foreign Application Priority Data

Oct. 2, 2020 (EP) .................................... 20199821

(51) Int. Cl.
*B66B 5/02* (2006.01)
*B66B 1/28* (2006.01)
(Continued)

(52) U.S. Cl.
CPC .................. *B66B 5/02* (2013.01); *B66B 1/28* (2013.01); *B66B 1/3461* (2013.01); *B66B 9/003* (2013.01); *B66B 11/0407* (2013.01)

(58) Field of Classification Search
CPC ........... B66B 5/02; B66B 1/28; B66B 5/0031; B66B 3/02
See application file for complete search history.

(56) References Cited

U.S. PATENT DOCUMENTS 5,877,462 A * 3/1999 Chenais ................ B66B 5/0031 187/382
7,546,903 B2 * 6/2009 Kattainen ............. B66B 1/3492 187/316

(Continued)

FOREIGN PATENT DOCUMENTS

DE 10 2018 202 551 A1 8/2019
DE 10 2018 202 557 A1 8/2019

OTHER PUBLICATIONS

European Search Report and Search Opinion of application 20 19 9821 dated Mar. 11, 2021.

*Primary Examiner* — Rina I Duda
(74) *Attorney, Agent, or Firm* — Birch, Stewart, Kolasch & Birch, LLP

(57) ABSTRACT

An elevator safety system includes an elevator control unit configured to: monitor an elevator shaft, receive a position, a movement direction, and a speed of at least one elevator car arranged into the elevator shaft, and determine dynamically at least one authorized shaft section based on the monitoring, and on the position, the movement direction, and the speed of at least one elevator car, and to provide an authorization to the at least one elevator car to move, such as by a linear motor, in or into the authorized shaft section of the elevator shaft. The elevator safety system further includes at least one elevator car controller configured to: provide the position, the movement direction, and the speed of the at least one elevator car to the elevator control unit, and receive the authorization. The elevator control unit and the elevator car controller are arranged to be in communication with each other.

19 Claims, 4 Drawing Sheets

(51) Int. Cl.
*B66B 1/34* (2006.01)
*B66B 9/00* (2006.01)
*B66B 11/04* (2006.01)

(56) References Cited

U.S. PATENT DOCUMENTS

| | | | | |
|---|---|---|---|---|
| 7,819,228 | B2 * | 10/2010 | Terry | B66B 5/0031 187/249 |
| 9,958,250 | B2 * | 5/2018 | Reilio | G01P 3/42 |
| 2009/0255762 | A1 * | 10/2009 | Ketonen | B66B 13/22 702/182 |
| 2010/0206668 | A1 * | 8/2010 | John | B66B 5/0031 187/249 |
| 2013/0299282 | A1 * | 11/2013 | Kugiya | B66B 5/0031 187/247 |
| 2016/0318734 | A1 * | 11/2016 | Müller | B66B 11/022 |
| 2017/0327345 | A1 * | 11/2017 | Steinhauer | B66B 5/02 |
| 2020/0377332 | A1 | 12/2020 | Thum et al. | |
| 2021/0094798 | A1 | 4/2021 | Thum et al. | |

* cited by examiner

ELEVATOR SAFETY SYSTEM, METHOD FOR COLLISION PROTECTION IN AN ELEVATOR SYSTEM, AND ELEVATOR SYSTEM

FIELD OF THE INVENTION

The present invention relates in general to elevators. In particular, however not exclusively, the present invention concerns elevator safety systems and methods for elevator systems having several elevator cars movable within the same elevator shaft.

BACKGROUND

There are known elevators in which several elevator cars are movable in the same elevator shaft. Collision of the elevator car to any object on travel path in the elevator shaft may result in a loss of passenger life. There is thus need to develop solutions for collision prevention.

SUMMARY

An objective of the present invention is to provide an elevator safety system, a method for collision protection in an elevator system, and an elevator system. Another objective of the present invention is that the elevator safety system, the method, and the elevator system at least reduce the risk of collision of an elevator car to another elevator car or to other devices, such related to turning stations in the elevator shaft and/or ends of the shaft or shaft parts.

The objectives of the invention are reached by an elevator safety system, a method for collision protection in an elevator system, and an elevator system as defined by the respective independent claims.

According to a first aspect, an elevator safety system is provided. The elevator safety system comprises an elevator control unit configured to monitor an elevator shaft, such as sensor readings thereof, and to receive a position, a movement direction, and a speed of at least one, preferably a plurality of, elevator car(s) arranged into the elevator shaft, and to determine dynamically at least one authorized shaft section based on the monitoring, and on the position, the movement direction, and the speed of at least one elevator car, and to provide an authorization to the at least one elevator car to move, such as by a linear motor, in or into the authorized shaft section of the elevator shaft. The elevator safety system also comprises at least one, preferably a plurality of, elevator car controller(s) configured to provide the position, the movement direction, and the speed of the at least one elevator car to the elevator control unit, and to receive the authorization. The elevator control unit and the elevator car controller(s) are arranged to be in communication with each other.

In various embodiments, the monitoring of the elevator shaft may include monitoring status of at least one of the following: a turning station, a turning station locking device, a landing floor door, an end portion of the elevator shaft, a maintenance station.

Alternatively or in addition, the elevator control unit may be configured to divide the elevator shaft into a plurality of shaft parts, such as based on one of the following: the shaft part is a vertical, horizontal, or inclined shaft part.

Furthermore, the elevator control unit may be configured to divide at least one of the plurality of shaft parts into a plurality of said authorized shaft sections. Optionally, the authorized shaft section may be a portion of one of the shaft parts, such as in a range of 1-99 percent, or 10-90 percent, or even 15-50 percent of total length of the shaft part.

In various embodiments, each one of the at least one elevator car controller may be arranged on one of the at least one elevator car, respectively.

In various embodiments, the elevator control unit may be configured to provide the authorization to one of the elevator cars to move, such as by a linear motor, in a first authorized shaft section, and to provide the authorization to another of the elevator cars to move, such as by a linear motor, in a second authorized shaft section.

Furthermore, the at least one elevator car controller may be configured to stop the movement of the at least one elevator car if it has not received the authorization of the current or the next shaft part so as to avoid the elevator car moving in or into an unauthorized section.

In some embodiments, the monitoring may comprises monitoring of a correct position of the turning station and/or a locked status of the turning station locking device.

In addition, the determining dynamically may, preferably, allow changing the authorized shaft sections in the range from once per 10 seconds to 100 times per second. Thus, the elevator control unit may be capable of changing the authorized shaft sections once or many times during movement of the elevator car from its initial position to an intended final position. In some embodiments, the time interval may be in the range from 0.1 seconds or even shorter, that is, even 0.01 seconds. In some embodiments, the time interval is at most, that is the range has an upper end of, 10 seconds, or preferably 5 seconds, or more preferably one second.

According to a second aspect, a method for collision protection in an elevator system is provided. The method comprises:

- monitoring an elevator shaft, such as sensor readings thereof, by an elevator control unit;
- receiving, at the elevator control unit, a position, a movement direction, and a speed of at least one elevator car arranged into the elevator shaft;
- determining dynamically at least one authorized shaft section based on the monitoring, and on the position, the movement direction, and the speed of at least one elevator car,
- providing, by the elevator control unit, an authorization to the at least one elevator car to move in or into the authorized shaft section of the elevator shaft.

In various embodiments, the monitoring of the elevator shaft may include monitoring status of at least one of the following: a turning station, a turning station locking device, a landing floor door, an end portion of the elevator shaft, a maintenance station.

The method may further comprise dividing the elevator shaft into a plurality of shaft parts. Preferably, the method may comprise dividing at least one of the plurality of shaft parts into a plurality of said authorized shaft sections.

According to a third aspect, an elevator system is provided. The elevator system comprises a plurality of elevator cars movable by an electric linear motor in an elevator shaft, and an elevator safety system in accordance with the first aspect.

The present invention provides an elevator safety system, a method for collision protection in an elevator system, and an elevator system. The present invention provides advantages over known solutions in that it allows several elevator cars to be moved within same elevator shaft and improves the movement thereof.

The risk of collision is at least reduced if not completely prevented. Furthermore, various embodiments of the present invention allow extension of the elevator shaft in multiple different construction phases since the safety system can be configured to authorize movement of the elevator car(s) only in a portion of the shaft.

Various other advantages will become clear to a skilled person based on the following detailed description.

The terms "first", "second" etc. are herein used to distinguish one element from other element, and not to specially prioritize or order them, if not otherwise explicitly stated.

The exemplary embodiments of the present invention presented herein are not to be interpreted to pose limitations to the applicability of the appended claims. The verb "to comprise" is used herein as an open limitation that does not exclude the existence of also unrecited features. The features recited in depending claims are mutually freely combinable unless otherwise explicitly stated.

The novel features which are considered as characteristic of the present invention are set forth in particular in the appended claims. The present invention itself, however, both as to its construction and its method of operation, together with additional objectives and advantages thereof, will be best understood from the following description of specific embodiments when read in connection with the accompanying drawings.

BRIEF DESCRIPTION OF FIGURES

Some embodiments of the invention are illustrated by way of example, and not by way of limitation, in the figures of the accompanying drawings.

DETAILED DESCRIPTION OF SOME EMBODIMENTS

Figure 1:
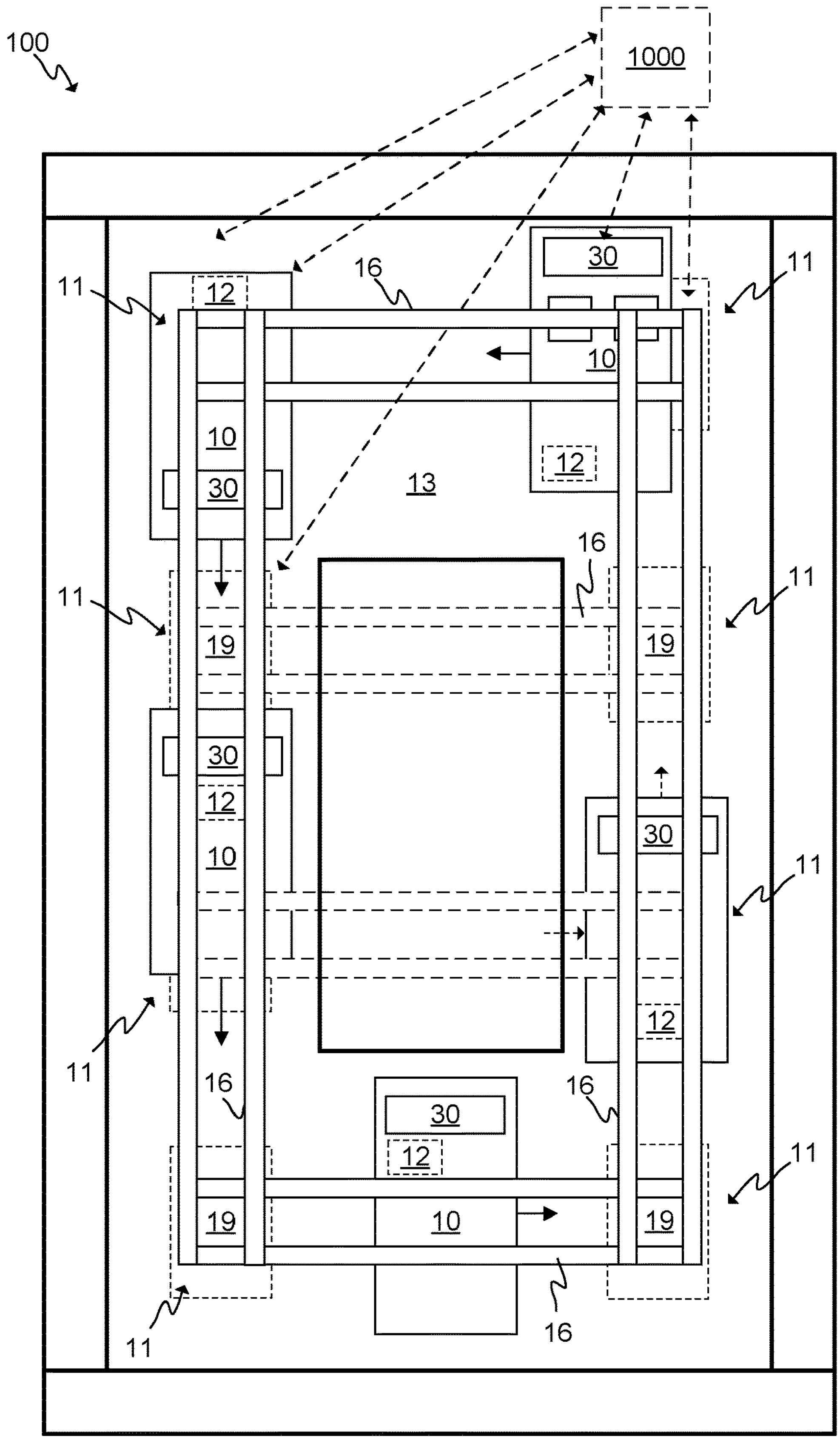
FIG. 1 illustrates schematically an elevator system according to an embodiment of the present invention.

FIG. 1 illustrates schematically an elevator system 100 according to an embodiment of the present invention. The elevator system 100 may comprise at least one or a plurality of elevator cars 10 moving in the elevator shaft 13 or the elevator car pathway 13. The elevator car(s) 10 may comprise a first electrical converter unit 12, such as comprising a frequency converter or an inverter, and, preferably, a first energy storage such as a battery or batteries. The first electrical converter unit 12 may be utilized for operating a mover arranged to the elevator car 10 for moving the car 10 along the elevator shaft 13. There may also be other electrically operated equipment in the elevator car 10 such as lighting, doors, user interface, emergency rescue equipment, etc. The first electrical converter unit 12 or a further electrical converter unit, such as an inverter or a rectifier, may be utilized for operating one or several of said other equipment of the elevator car 10. The first energy storage may, preferably and if any, be electrically coupled to the first electrical converter unit 12, for example, to the intermediate circuit of the frequency converter, for providing electrical power to the first electrical converter unit 12 and/or for storing electrical energy provided by the first electrical converter unit or a further electrical converter unit or other electrical power source.

There are preferably at least two landing floors, having landing floor doors 19 or openings 19, comprised in the elevator system 100. There may also be doors comprised in the elevator car 10. Although shown in FIG. 1 that there are two horizontally separated sets, or "columns", of vertically aligned landing floors, there could as well be only one column as in conventional elevators or more than two, for example, three.

Regarding the elevator shaft 13, it may be such as defining substantially closed volume in which the elevator car 10 is adapted and configured to be moved. The walls may be, for example, of concrete, metal or at least partly of glass, or any combination thereof. The elevator shaft 13 herein refers basically to any structure or pathway along which the elevator car 10 is configured to be moved.

As can be seen in FIG. 1 with respect to the multi-car elevator system 100, the elevator car 10 or cars 10 may be moved along the elevator shaft 13 vertically and/or horizontally depending on the direction of stator beams 16. According to embodiments similar to one in FIG. 1 in this respect, the elevator car 10 or cars 10 may be configured to be moved along a number of vertical stator beams 16, inclined stator beams (not shown), and/or horizontal stator beams 16, for example, two beams such as in FIG. 1. Some of the stator beams 16 are illustrated with dashed lines indicating their optionality. However, it should be realized that there may also be stator beams 16 in the middle part of the shaft 13, such as shown in FIG. 1.

The stator beams 16 are part of an electric linear motor of the elevator system 100 utilized to move the elevator car 10 or cars 10 in the elevator shaft 13. The stator beams 16 may, preferably, be arranged in fixed manner, that is, stationary with respect to the elevator shaft 13, for example, to a wall of the shaft by fastening portions, which may be arranged to be rotatable at turning stations 11, such as comprising a turning device, for example, a turngear or a turntable or the like.

The elevator system 100 may comprise an elevator control unit 1000 for controlling the operation of the elevator system 100. The elevator control unit 1000 may be a separate device or may be comprised in the other components of the elevator system 100 such as in or as a part of the electrical converter unit 12. The elevator control unit 1000 may also be implemented in a distributed manner so that, e.g., one portion of the elevator control unit 1000 may be comprised in the electrical converter unit 12 and another portion in the elevator car 10. The elevator control unit 1000 may also be arranged in distributed manner at more than two locations or in more than two devices.

The elevator control unit 1000 may comprise one or more processors, one or more memories being volatile or non-volatile for storing portions of computer program code and any data values and possibly one or more user interface units. The mentioned elements may be communicatively coupled to each other with e.g. an internal bus.

The processor of the elevator control unit 1000 may at least be configured to implement at least some method steps as described hereinafter. The implementation of the method may be achieved by arranging the processor to execute at least some portion of computer program code stored in the memory causing the processor, and thus the elevator control unit 1000, to implement one or more method steps as described hereinafter. The processor may thus be arranged to access the memory and retrieve and store any information therefrom and thereto. For sake of clarity, the processor herein refers to any unit suitable for processing information and control the operation of the elevator control unit 1000, among other tasks. The operations may also be implemented with a microcontroller solution with embedded software. Similarly, the memory is not limited to a certain type of memory only, but any memory type suitable for storing the described pieces of information may be applied in the context of the present invention.

Still further, the elevator cars 10 may, preferably, comprise elevator car controllers 30 for controlling various functionalities of the elevator car 10. These functionalities may at least comprise movement related operations, such as taking part in, or completely performing, controlling the operation of the mover which is operatively coupled to the elevator car 10 for moving thereof. The elevator car controllers 30 may preferably be arranged in communication connection with the elevator control unit 1000.

Alternatively, there may be one elevator car controller 30 for a group of elevator cars 10 in which case the elevator car controller 30 may not have been arranged on any one of the elevator cars 10.

Figure 2:
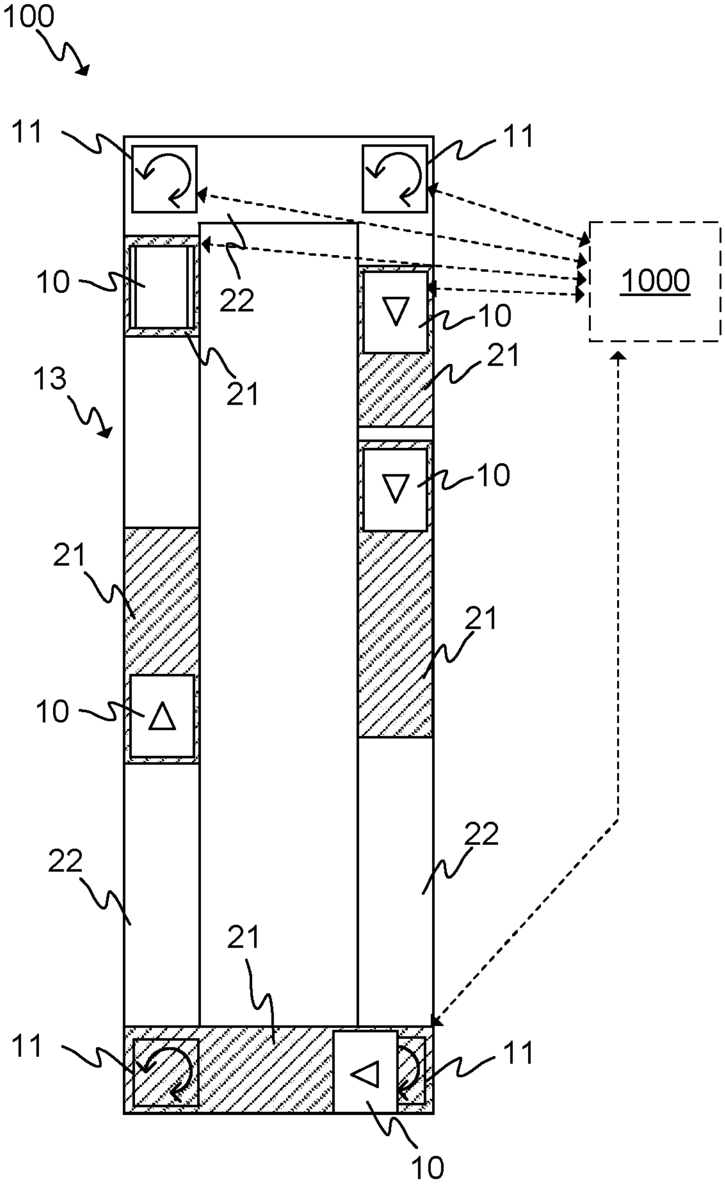
FIG. 2 illustrates schematically an elevator system according to an embodiment of the present invention.

FIG. 2 illustrates schematically an elevator system 100 according to an embodiment of the present invention. In FIG. 2, although not shown, the elevator cars 10 preferably comprise elevator car controllers 30. The arrowhead symbols on some of the elevator cars 10 indicate the current movement direction of the elevator car 10. Some communication connections between the elevator control unit 1000 and the elevator cars 10 and/or the elevator shaft 13, such as devices or components therein, are shown in FIG. 2 with two-headed dashed lines. The two-headedness indicates that data may, optionally, be transferred into two direction between said devices, however, in some embodiments, uni-directional communication connection may be sufficient. Said data may be, for example, related to feedback signals, such as to status readings, sensor readings, and/or to control signals, such as for changing status of the devices or components in the elevator shaft 13 or related to providing authorization and/or motion command or profile for the elevator car 10.

The elevator control unit 1000 may be configured to monitor the elevator shaft 13, such as sensor readings thereof. These may, optionally, relate to at least one of the following: a turning station 11 (shown with a two-headed circular arrow), a turning station locking device, a landing floor door, an end portion of the elevator shaft, a maintenance station.

In some embodiments, the monitoring may comprise monitoring of a correct position of the turning station and/or a locked status of the turning station locking device. This will be further described hereinafter.

Furthermore, the elevator control unit 1000 may be configured to receive a position, a movement direction, and a speed of at least one or several or each one of the elevator cars 10. Of course, also other data, such as related to the control or the feedback, may be transmitted therebetween.

Thus, in various embodiments, the elevator car controller 30 may be configured to provide the position, the movement direction, and the speed of the at least one elevator car 10 to the elevator control unit 1000. Thus, the elevator control unit 1000 may receive the position, the movement direction, and the speed information from a plurality of elevator cars 10 in continuous manner or in certain time intervals, and/or at certain positions of the shaft 13, and may be configured to determine current situation in the shaft 13 with respect to locations and movement of the elevator cars 10 and statuses of the shaft devices.

In various embodiments, the elevator control unit 1000 may be configured to include a mapping of the elevator shaft 13, such as including absolute and/or relative positions of the elevator shaft. The mapping preferably corresponds to the received position, movement direction, and/or speed information so that, for example, the position of the elevator car 10 or cars 10 in the elevator shaft 13 is determined. Furthermore, the elevator control unit 1000 may preferably also be capable of determining distances between the elevator cars 10. Alternatively or in addition, the elevator control unit 1000 may be configured to determine that two of the elevator cars 10 are moving closer to each other or that the distance between them is getting smaller. Determining of the position of the elevator car 10 by the elevator car controller 30 may be based on absolute position sensor, such as reading markings in the elevator shaft 13. Alternatively or in addition, the position of the elevator car 10 by the elevator car controller 30 may be based on relative position sensor.

Still further, the elevator control unit 1000 may be configured to determine dynamically at least one authorized shaft section 21 based on the monitoring, and on the position, the movement direction, and the speed of at least one elevator car 10. As can be seen, the elevator control unit 1000 may divide the elevator shaft 13 into authorized shaft section(s) 21 and unauthorized shaft section(s) 22. Furthermore, as may be understood based on FIG. 2, the authorized shaft sections 21 may be determined for each one of the elevator cars 10. Thus, as shown in FIG. 2, the elevator shaft 13 includes several authorized shaft sections 21, one for each of the elevator cars 10. In various embodiments, the authorized shaft sections 21 may be characterized by a distance of the authorized shaft sections 21 relative to the current position of the elevator car 10. If the movement direction of the elevator car(s) 10 is not predetermined, that is the elevator cars 10 do not always move in a predetermined direction, the authorized shaft sections 21 may be further be characterized by a direction. Naturally, the direction may be determined in other cases too.

In various embodiments having a plurality of elevator cars 10 in the shaft 13, the elevator control unit 100 may be configured to provide the authorization to one of the elevator cars 10 to move, such as by a linear motor, in a first authorized shaft section, and to provide the authorization to another of the elevator cars to move, such as by a linear motor, in a second authorized shaft section.

The dynamical determination may refer herein to the elevator control unit 1000 being capable of changing the authorized shaft sections 21, such as the related distances and, optionally, the directions, in connection thereto, continuously, or in time intervals, or, optionally additionally, on demand. The time intervals, not necessarily having a fixed interval between two time instances, may preferably be short relative to the movement of the elevator car 10. Thus, the elevator control unit 1000 may be capable of changing the authorized shaft sections 21 once or many times during movement of the elevator car 10 from its initial position to an intended final position. In some embodiments, the time interval may be in the range from 0.1 seconds or even shorter, that is, even 0.01 seconds. The lower end of the range may depend on the data processing speed of the system, such as related to communication connections and properties of the sensors etc. In some embodiments, the time interval is at most, that is the range has an upper end of, 10 seconds, or preferably 5 seconds, or more preferably one second.

The elevator control unit 1000 may further be configured to provide an authorization to the at least one elevator car 10 to move, such as by the linear motor, in the authorized shaft section 21 of the elevator shaft 13. Therefore, the elevator car controllers 30 may be configured to receive the authorization. Thus, in various embodiments, the elevator control unit 1000 may provide, additionally or as included in the authorization, information about at least the distance and, optionally, the direction, related to the authorized shaft section 21 to the elevator car controller 30.

In addition, the at least one elevator car controller 30 may be configured to stop the movement of the at least one elevator car 10 if it has not received the authorization of the current or the next shaft part so as to avoid the elevator car 10 moving in or into an unauthorized shaft section 22.

In some embodiments, the elevator control unit 1000 may be configured to divide the elevator shaft 13 into a plurality of shaft parts. Such parts may be, for example, one of the following: vertical, horizontal, or inclined shaft part. In FIGS. 1 and 2, only vertical and horizontal parts are shown. The elevator shaft 13 of FIG. 1 may thus include two vertical parts and two, or optionally four, horizontal parts as defined by the stator beams 16.

As illustrated in FIG. 2, the elevator control unit 100 may be configured to divide at least one of the plurality of shaft parts into a plurality of authorized shaft sections 21. There are two authorized shaft sections 21 in both vertical shaft parts. Especially, in the vertical shaft part on the right, there are two authorized shaft sections 21 which allow movement of the elevator cars 10 therein. In the vertical shaft part on the left, one of the elevator cars 10 is not moving, that is stopped to its position and, thus, its authorized shaft sections 21, if any, is limited essentially to the position of the car 10 itself. The stopping may occur, for example, at a landing or before entering a turning station 11, or in basically any position of the shaft 13 if requirements for stopping the elevator car 10 are being fulfilled.

In various embodiments, the authorized shaft section 21 may, thus, be a portion of the shaft part, such as, in a range of 1-99 percent, or 10-90 percent, or even 15-50 percent of total length of the shaft part. Even though being schematically illustrated, there are in FIG. 2, in both of the vertical shaft parts, two authorized shaft section 21 at least in the range of 1-99 percent. However, in the bottom of the shaft 13, there is the horizontal part which is completely reserved for the elevator car 10 currently positioned therein. Not all authorized shaft sections 21 are necessarily in said ranges even if some them would be.

In some embodiments, alternatively or in addition, the turning station 11 may be arranged to represent one part of the shaft 13. Thus, the vertical and/or horizontal parts may be limited by the turning stations 11.

Figure 3:
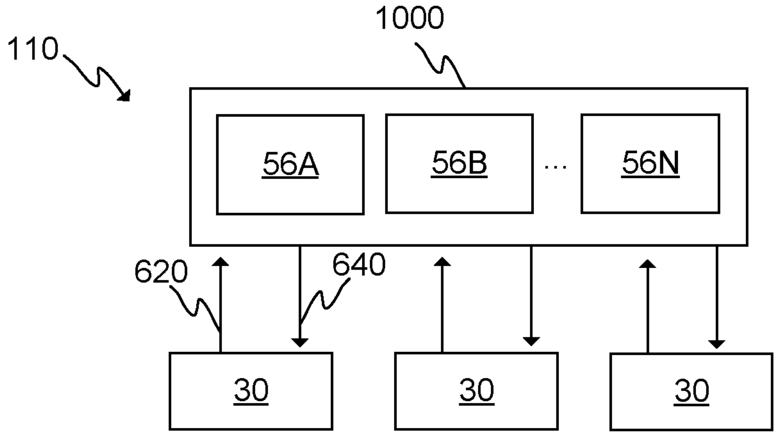
FIG. 3 illustrates schematically an elevator safety system according to an embodiment of the present invention.

FIG. 3 illustrates schematically an elevator safety system 110 according to an embodiment of the present invention. The safety system 110 may comprise at least the elevator control unit 1000, or a part thereof, such as one or several shaft part safety controllers 56A-56N.

The shaft part safety controller 56A-56N may be configured to monitor and control, such as receive a position, a movement direction, and a speed of at least one elevator car 10 arranged into the elevator shaft part, and determine dynamically at least one authorized shaft section of the shaft part based on the monitoring, and on the position, the movement direction, and the speed of at least one elevator car, and provide an authorization to the at least one elevator car 10 to move, such as by a linear motor, in the authorized shaft section of the respective shaft part.

Furthermore, the elevator safety system 110 may comprise one or, preferably, several elevator car controllers 30 at least in communication connection with the elevator control unit 1000 or a shaft part safety controller 56A-56N thereof. Item 620 may refer to at least receiving/providing a position, a movement direction, and a speed of at least one elevator car arranged into the elevator shaft 13 or a shaft part thereof. Item 640 may refer to at least providing an authorization to the at least one elevator car to move, such as by a linear motor, in the authorized shaft section of the elevator shaft 13 or a shaft part thereof.

As described with respect to FIG. 2, for example, the elevator control unit 1000 and/or the elevator car controller(s) 30 may also be configured to implement one or several other tasks.

Figure 4:
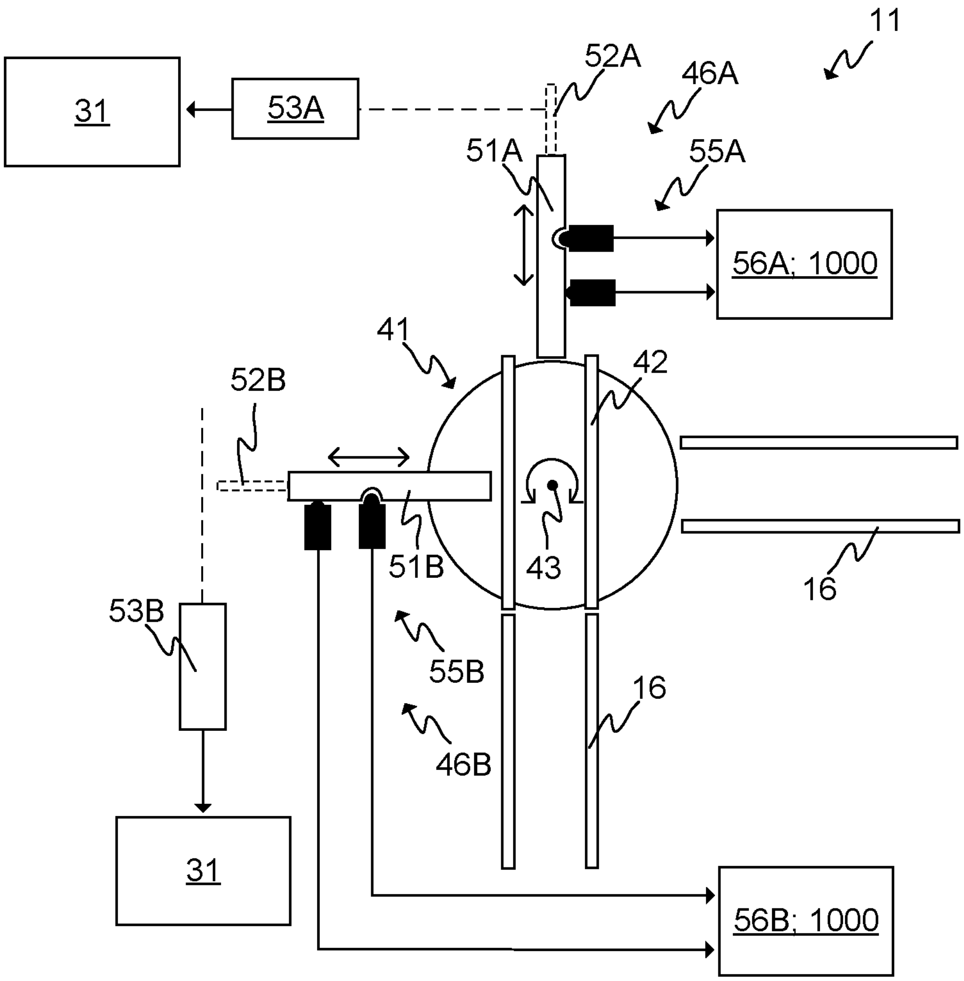
FIG. 4 illustrates schematically a turning station according to an embodiment of the present invention.

FIG. 4 illustrates schematically a turning station 11 according to an embodiment of the present invention. The turning station 11 may comprise a turning device 41 which may be arranged rotatable around its axis of rotation 43. In various embodiments, the turning device 41 may comprise a rotatable platform and in connection thereto stator beam parts 42 of the turning station 11 being similar or corresponding with respect to the stator beams 16 of the electric linear motor of the elevator system 100. In FIG. 4, the turning device 41 resembles a turntable, for instance, having an axis of rotation 43. As can be seen in FIG. 4, there are two parallel stator beams 16 extending from below to the turning station 11. Another set of two parallel stator beams 16 extend to the right of the turning station 11.

The primary function of the turning station 11 is thus to enable movement of the elevator car 10 between said two sets of the stator beams 16. Thus, the turning device 41 must be in a correct position with respect to the stator beams 16 from which and/or to which the elevator car 10 is moving in order to avoid derailment of the elevator car 10. The correct position depends, of course, from which the elevator car 10 is approaching the turning station 11 or to which direction is the elevator car 10 is about to move. As becomes clear, the turning device 41 is thus configured to turn or at least allow turning of the stator beam parts 42 of the turning device 41.

The turning station 11 may additionally comprise locking devices 46A, 46B of the turning station 11. The purpose of the locking device(s) 46A, 46B is to lock the turning device 41 into its position, thereby, preferably, preventing it from turning at least as long as the locking devices 46A, 46B are in their locked states, that is have locked statuses.

In various embodiments, the elevator system 100, optionally the elevator control unit 1000, may be configured to monitor the status of the locking devices 46A, 46B with two independent sensor systems. The systems may be different types of systems with respect to each other as will be illustrated in FIG. 4 and described in connection thereto. In preferable embodiments, both sensor systems must indicate the locking status in order for the elevator control unit 1000 to determine that the turning device 41 is really locked. If the turning station 11 is not in the correct position while elevator car 10 enters or exits the station 11, the elevator car 10 can fall of the shaft beams 16. This can advantageously be prevented by various embodiments as described herein.

Regarding said one of the independent sensor systems and in embodiments in accordance with FIG. 4, the locking devices 46A, 46B comprise a lock plunger 51A, 51B and locking device sensor 55A, 55B operatively coupled to the lock plunger 51A, 51B for determining the position of the lock plunger 51A, 51B and, thereby the status of the locking device 46A, 46B. The locking device sensor 55A, 55B may comprise two sensor elements (shown with black fill color in FIG. 4) adapted so that one of them is arranged to indicate whether the lock plunger 51A, 51B is in a fully extended state, that is the lock is open, or in some other state. The other one of the two sensor elements is arranged to indicate whether the lock plunger 51A, 51B is in a fully retracted state, that is the lock is closed, or in some other state.

One of the sensors 55A may be further arranged to provide readings thereof to an elevator control unit 1000 or to a first shaft part safety controller 56A in communication connection with the elevator control unit 1000. The first shaft part safety controller 56A may, alternatively or in addition, be comprised in the elevator control unit 1000. The other one of the sensors 55B may be further arranged to provide readings thereof to an elevator control unit 1000 or to a second shaft part safety controller 56B in communication connection with the elevator control unit 1000. The second shaft part safety controller 56B may, alternatively or in addition, be comprised in the elevator control unit 1000.

Regarding said other one of the independent sensor systems and in embodiments in accordance with FIG. 4, there may be indicative elements 52A, 52B, such as physical flags, mounted on the lock plunger(s) 51A, 51B.

The elevator cars 10 may further comprise second locking device sensor(s) 53A, 53B, for example, proximity sensors. The operation of the second locking device sensor(s) 53A, 53B may be based, for example, emitting electromagnetic waves and then, based on the received signal, such as reflected signal, determining if the indicative element 52A, 52B is in the position corresponding to the locked state or in the open state of the locking device(s) 46A, 46B. The second locking device sensor 53A, 53B may be arranged to provide readings thereof to the elevator car safety monitor 31. The elevator car safety monitor 31 may be part of the elevator car controller 30 or may, preferably, operate independently thereof. The elevator car safety monitor 31 may be configured to detect such indicative elements 52A, 52B or the like in other parts of the elevator shaft 13 as well, such as related to an end of the elevator shaft 13 and/or to a door zone of a landing 19. Thus, when the elevator car 10 approaches the turning station 11, it can be arranged, in addition to the authorization from the elevator control unit 1000, monitor the status of the turning station 11, such as whether it is in the correct position in view of the elevator car 10.

Thus, additionally, the elevator control unit 1000 may be configured to provide the authorization to the elevator car 10 in order to enter the turning station 11 if the status of the locking devices 46A, 46B so allows and, optionally, if there is no other cars 10 in the turning station 11. In some embodiments, the elevator car controller 30 may provide the determined status of the second locking device sensor(s) 53A, 53B and, thereby of the locking devices 46A, 46B, only after which the elevator control unit 1000 determines whether the elevator car 10 can enter the turning station 11.

If the turning station 11 is in an incorrect position and/or the locking device 46A, 46B is not locked, stopping of the elevator car 10 can be initiated, thus involving operating elevator car stopping system 50, such as including elevator car brake(s), and/or braking or safety stop devices in the elevator shaft 13.

Figure 5:
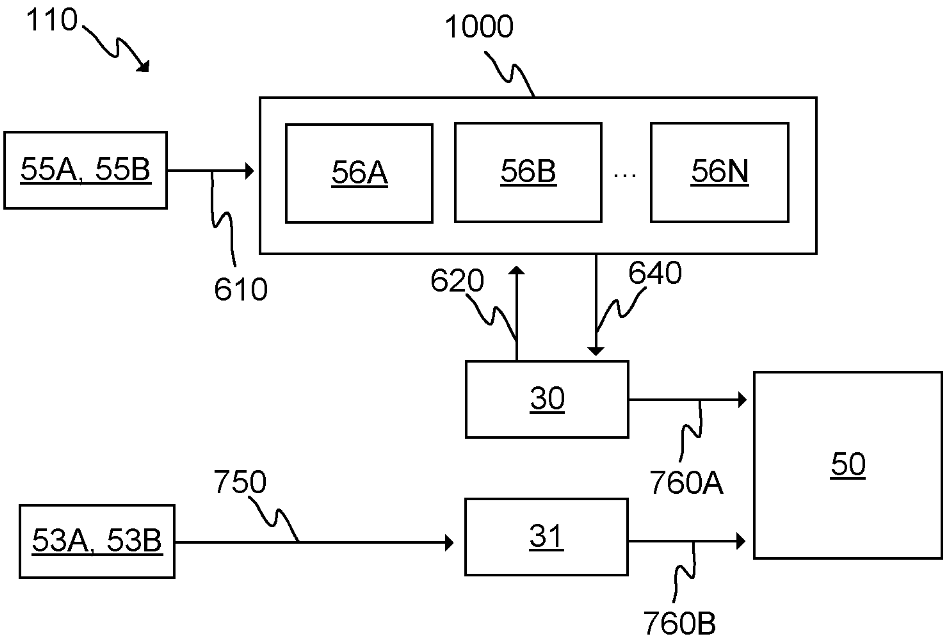
FIG. 5 illustrates schematically an elevator safety system according to an embodiment of the present invention.

FIG. 5 illustrates schematically an elevator safety system 110 according to an embodiment of the present invention. Different elements in FIG. 5 are already described hereinbefore, however, item 640 may, in some embodiments, especially refer to providing an authorization to the elevator car 10 to move, such as by a linear motor, into or out of the authorized shaft section 21 of the elevator shaft 13, the authorized shaft section 21 in this case including the turning station 11.

In various embodiments, item 610 may include monitoring, such as reading or receiving, of a correct position of the turning station 11 and/or a locked status of the turning station locking device 46A, 46B.

Furthermore, item 750 may refer to determining if the indicative element 52A, 52B is in the position corresponding to the locked state or in the open state of the locking device(s) 46A, 46B.

Still further, items 760A and 760B may refer to initiating stopping of the elevator car 10 if the conditions for the stop are met. This may mean that either one or both of the independent sensor systems indicate that the turning station 11 is in an incorrect position and/or is not locked. The initiating may comprise providing a stopping command to the elevator car stopping system 50, thereby operating the system 50 in order to prevent the car 10 entering or exiting the turning station 11.

Figure 6:
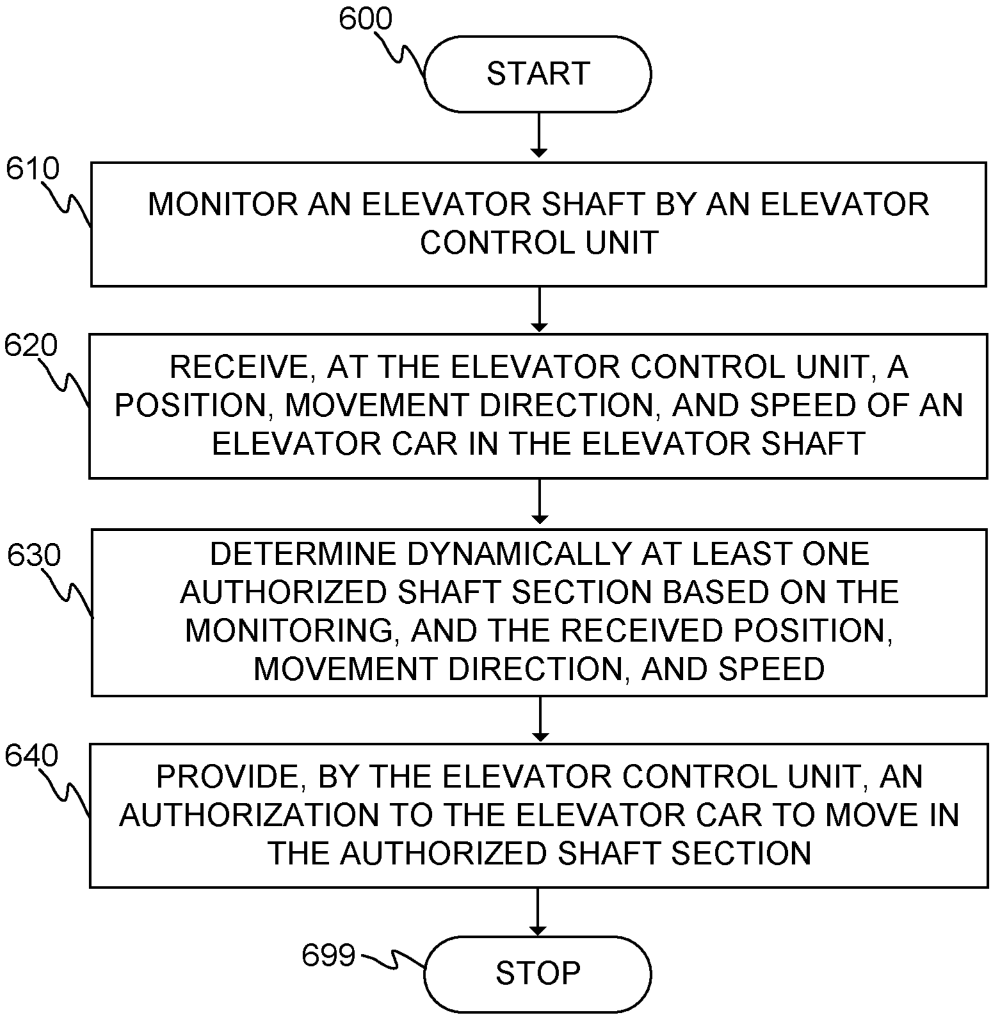
FIG. 6 shows a flow diagram of a method according to an embodiment of the present invention.

FIG. 6 shows a flow diagram of a method according to an embodiment of the present invention.

Step 600 refers to a start-up phase of the method. Suitable equipment and components are obtained and systems assembled and configured for operation.

Item 610 may refer to monitoring an elevator shaft 13, such as sensor readings thereof, by an elevator control unit 1000 or shaft part safety controller(s) 56A-56N.

In various embodiments, the monitoring of the elevator shaft may include monitoring the status of at least one of the following: a turning station, a turning station locking device, a landing floor door, an end portion of the elevator shaft, a maintenance station.

Item 620 may refer to receiving, at the elevator control unit 1000 or the shaft part safety controller(s) 56A-56N, a position, a movement direction, and a speed of at least one elevator car 10 arranged into the elevator shaft 13. Said information may preferably be provided by the elevator car controller 30.

Item 630 may refer to determining dynamically at least one authorized shaft section 21 based on the monitoring, and on the position, the movement direction, and the speed of at least one elevator car, item 640 may refer to providing, by the elevator control unit 1000 or the shaft part safety controller(s) 56A-56N, an authorization to the at least one elevator car 10 to move in or into the authorized shaft section 21 of the elevator shaft 13. Said authorization may preferably be received by the elevator car controller 30.

In various embodiments, the method may further comprise maintaining the position of or stopping the at least one elevator car 10 if it, such as the elevator car controller 30 thereof, has not received the authorization.

Method execution may be stopped at 699.

Furthermore, the method may comprise dividing the elevator shaft 13 into a plurality of shaft parts. Each one of the plurality of shaft parts may be one of the following: vertical, horizontal, or inclined shaft part. There may, thus, be shaft part safety controllers 56A-56N arranged to control the shaft parts, respectively. Alternatively or in addition, the elevator control unit 1000 may be configured to control several or all shaft parts.

In addition, the method may comprise dividing at least one of the plurality of shaft parts into a plurality of said authorized shaft sections 21, such as to a first and second authorized shaft sections 21 for two elevator cars 10, respectively.

The invention claimed is:

1. An elevator safety system, comprising:
an elevator control unit configured to:
monitor an elevator shaft;
receive a position, a movement direction, and a speed of a first elevator car and a second elevator car arranged into the elevator shaft;
determine dynamically a first authorized shaft section and a second authorized shaft section based on the monitoring, and on the position, the movement direction, and the speed of the first elevator car and the second elevator car; and
provide an authorization to the first elevator car and the second elevator car to move in or into the first authorized shaft section of the elevator shaft and the second authorized shaft section of the elevator shaft, respectively, the first authorized shaft section and second authorized shaft section being different; and
at least one elevator car controller configured to:
provide the position, the movement direction, and the speed of the first elevator car and the second elevator car to the elevator control unit;
receive the authorization; and
control movement of the first elevator car and the second elevator car based on the authorization,
wherein the elevator control unit and the at least one elevator car controller are arranged to be in communication with each other.

2. The elevator safety system of claim 1, wherein the monitoring of the elevator shaft includes monitoring status of at least one of the following: a turning station, a turning station locking device, a landing floor door, an end portion of the elevator shaft, a maintenance station.

3. The elevator safety system of claim 1, wherein the elevator control unit is configured to divide the elevator shaft into a plurality of shaft parts.

4. The elevator safety system of claim 3, wherein each one of the plurality of shaft parts is one of the following: vertical, horizontal, or inclined shaft part.

5. The elevator safety system of claim 3, wherein the elevator control unit is configured to divide at least one of the plurality of shaft parts into a plurality of said authorized shaft sections.

6. The elevator safety system of claim 3, wherein the authorized shaft section is a portion of one of the shaft parts.

7. The elevator safety system of claim 6, wherein the portion is in a range of 1-99 percent, or 10-90 percent, or even 15-50 percent of total length of the shaft part.

8. The elevator safety system of claim 1, wherein the at least one elevator car controller includes a first elevator car controller arranged on the first elevator car and a second elevator car controller arranged on the second elevator car.

9. The elevator safety system of claim 1, wherein the at least one elevator car controller is a plurality of elevator car controllers.

10. The elevator safety system of claim 1, wherein the at least one elevator car controller is configured to stop the movement of the first elevator car if it has not received the authorization of the current or the next shaft part so as to avoid the first elevator car moving in or into an unauthorized section.

11. The elevator safety system of claim 2, wherein the monitoring comprises monitoring of a correct position of the turning station and/or a locked status of the turning station locking device.

12. The elevator safety system of claim 1, wherein the determining dynamically allows changing the authorized shaft sections in the range from once per 10 seconds to 100 times per second.

13. An elevator system comprising:
a plurality of elevator cars movable by an electric linear motor in an elevator shaft; and
the elevator safety system of claim 1.

14. The elevator safety system of claim 2, wherein the elevator control unit is configured to divide the elevator shaft into a plurality of shaft parts.

15. The elevator safety system of claim 4, wherein the elevator control unit is configured to divide at least one of the plurality of shaft parts into a plurality of said authorized shaft sections.

16. A method for collision protection in an elevator system, comprising:
monitoring an elevator shaft;
receiving, at the elevator control unit, a position, a movement direction, and a speed of a first elevator car and a second elevator car arranged into the elevator shaft;
determining dynamically a first authorized shaft section and a second authorized shaft section based on the monitoring, and on the position, the movement direction, and the speed of the first elevator car and the second elevator car; and
providing, by the elevator control unit, an authorization to the first elevator car and the second elevator car to move in or into the first authorized shaft section of the elevator shaft and the second authorized shaft section of the elevator shaft, respectively, the first authorized shaft section and second authorized shaft section being different.

17. The method of claim 16, wherein the monitoring of the elevator shaft includes monitoring status of at least one of the following: a turning station, a turning station locking device, a landing floor door, an end portion of the elevator shaft, a maintenance station.

18. The method of claim 16, comprising dividing the elevator shaft into a plurality of shaft parts.

19. The method of claim 18, comprising dividing at least one of the plurality of shaft parts into a plurality of said authorized shaft sections.

* * * * *